(12) United States Patent
Bowater

(10) Patent No.: US 9,447,903 B2
(45) Date of Patent: Sep. 20, 2016

(54) HOSE CLAMP WITH FLAT SPRING LINER

(71) Applicant: IDEAL CLAMP PRODUCTS, INC., Smyrna, TN (US)

(72) Inventor: Bruce D. Bowater, Franklin, TN (US)

(73) Assignee: Ideal Clamp Products, Inc., Smyrna, TN (US)

( * ) Notice: Subject to any disclaimer, the term of this patent is extended or adjusted under 35 U.S.C. 154(b) by 78 days.

(21) Appl. No.: 14/181,892

(22) Filed: Feb. 17, 2014

(65) Prior Publication Data

US 2014/0310922 A1   Oct. 23, 2014

Related U.S. Application Data

(63) Continuation of application No. 13/188,093, filed on Jul. 21, 2011, now Pat. No. 8,650,719.

(51) Int. Cl.
*F16L 33/08* (2006.01)
*F16L 33/02* (2006.01)

(52) U.S. Cl.
CPC ............... *F16L 33/08* (2013.01); *F16L 33/02* (2013.01); *Y10T 24/14* (2015.01); *Y10T 24/1412* (2015.01); *Y10T 24/1427* (2015.01); *Y10T 24/1441* (2015.01); *Y10T 24/1457* (2015.01)

(58) Field of Classification Search
None
See application file for complete search history.

(56) References Cited

U.S. PATENT DOCUMENTS

| 2,089,940 A | 8/1937 | Brown |
|---|---|---|
| 3,142,881 A | 8/1964 | Johnston |
| 3,303,669 A | 2/1967 | Oetiker |
| 4,308,648 A | 1/1982 | Fay |
| 4,310,956 A | 1/1982 | Meckstroth et al. |
| 4,312,101 A | 1/1982 | Oetiker |
| D285,171 S | 8/1986 | Russell |
| 4,667,375 A | 5/1987 | Enlund |
| 5,115,541 A | 5/1992 | Stichel |
| 5,195,788 A | 3/1993 | Oetiker |
| 5,220,710 A | 6/1993 | Laudan |
| 5,309,607 A | 5/1994 | Hohmann et al. |
| 5,630,255 A | 5/1997 | Eliasson |
| 6,000,104 A | 12/1999 | Mann |
| 6,088,886 A | 7/2000 | Gyongyosi |
| 7,302,741 B2 | 12/2007 | Bowater |
| 8,650,719 B2 | 2/2014 | Bowater |
| 2005/0039306 A1 | 2/2005 | Logan et al. |
| 2006/0162131 A1 | 7/2006 | Bowater |

FOREIGN PATENT DOCUMENTS

| CN | 2234031 Y | 8/1996 |
|---|---|---|
| CN | 101855487 A | 10/2010 |
| DE | 10061425 A1 | 6/2002 |

OTHER PUBLICATIONS

English translation of Office Action issued by the Chinese Intellectual Property Office for Chinese Application No. 201280045766.0, Jan. 23, 2015, 6 pages.
European Search Report for European Application No. 12814366.6-1758 / 2734766 PCT/US2012/047597, Feb. 12, 2015, 8 pages.
International Search Authority; Patent Cooperation Treaty International Search Report for International Application No. PCT/US2012/047600; Oct. 5, 2012; 8 pages.
International Search Authority; Patent Cooperation Treaty International Search Report for International Application No. PCT/US2012/047597; Oct. 5, 2012; 7 pages.

*Primary Examiner* — Jack W Lavinder
(74) *Attorney, Agent, or Firm* — Barnes & Thornburg LLP

(57) ABSTRACT

An improved hose clamp having an annular band having an inner face, tensioning means, and an annular spring liner; the spring liner having a circumferential shoulder near an edge of the liner; and a central, cylindrical, flat, contact portion of smaller circumference than the shoulder, and of smaller width than the inner face of the band. The shoulder is adapted to abut the inner face and the contact portion is adapted to contact a hose or other article to be clamped.

9 Claims, 3 Drawing Sheets

HOSE CLAMP WITH FLAT SPRING LINER

This application is a continuation of and claims priority to U.S. patent application Ser. No. 13/188,093, now U.S. Pat. No. 8,650,719, which was filed on Jul. 21, 2011 and is expressly incorporated herein by reference.

BACKGROUND OF THE INVENTION

1. Field of the Invention

This invention relates generally to the field of hose clamp assemblies, more particularly to a spring liner that is associated with a hose clamp assembly, and specifically to a spring liner with a central, flat, hose-contact portion.

2. Description of the Prior Art

Hose clamps are commonly utilized to join together hoses and fittings or connectors (referred to hereinafter as fittings), for example, within the automotive industry. Hose clamps, hose and fittings respond to changes in ambient temperature and system temperatures based on the thermal properties of the aforementioned components. Differing coefficients of thermal expansion of these components can result in thermally-induced reductions in clamping force, thus creating the potential for fluid or gas leakage. In addition, changes in elasticity of the hose materials over time due to creep, compression set, or deterioration can also reduce the clamping force and create the potential for fluid leakage.

Various types of spring liners used in conjunction with hose clamps are known. U.S. Pat. Nos. 7,178,204 and 7,302,741 are exemplary of the art, disclosing a spring liner having two inward projecting ridges with an outward-projecting ridge in between. The ridges create two zones of very high compression in the hose, while the central ridge area creates a zone of lesser compression.

Mention is also made of a co-pending application by the same applicant titled "Hose Clamp With Rippled Spring Liner," filed on the same day as the present application, the contents of which are hereby incorporated herein by reference.

SUMMARY

It is an aspect of the present invention to provide an improved spring liner which allows a hose clamp to self-compensate for changes in elastic properties and diametric changes of the underlying hose and fittings. The invention is directed to an annular spring liner for a hose clamp having a circumferential shoulder near each edge of the liner and a central inwardly-directed circumferential, cylindrical ridge with flat contact portion there between the two shoulders. The hose clamp seats on the shoulders of the liner when the clamp is tensioned. Thus, at least after assembly, and before tensioning of the hose clamp, the flat central ridge is separated from the inner face of the tensioning band of the hose clamp by a gap of constant thickness. The width of the flat contact portion is less than the width of the inner face of the tensioning band. The width of the flat contact portion may be in the range from 40% to 75% of the width of the inner face of the tensioning band.

In another embodiment of the invention, the spring liner further has on at least a portion of one or both circumferential edges a radially outwardly-flared flange.

It is another aspect of the present invention to provide an improved hose clamp assembly having an annular band having an inner face, a tensioner disposed to facilitate constriction of the band, and the annular spring liner as described above.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The present invention provides a means of reducing the contact surface area of the inside diameter (ID) of traditional worm-gear hose clamp in order to increase the unit loading the hose clamp assembly imparts to the underlying hose or substrate. The reduction in contact surface area is achieved by the use of a circular liner that is inserted into the ID of a hose clamp or tensioning band 1. The cross-section of the liner has shoulders 5 with contact surfaces on their outside diameter (OD) which are together approximately equal in axial extent (width) to the inside surface width of the hose clamp or tensioning band. The edges of the shoulders may project upward towards the hose clamp or tensioning band at angles to hold the liner captive within the hose clamp or tensioning band ID. The profile of the liner also includes a flat, cylindrical contact portion 7 positioned inward or lower than shoulders 5. By contact is meant that flat portion 7 is intended to contact the underlying hose or substrate. This surface is narrower than the hose clamp or tensioning band 1 width and may be in the range of 40% to 75% of the hose clamp or tensioning band width. Two legs 6 bridge between the two shoulders and the lower contact portion 7 of the liner. These legs may be symmetrical and are located on either side of the lower contact surface and project outward at acute angles relative to the clamp centerline, thus reaching to and attaching to the upper shoulders.

The increase in unit loading can also be described as an increase in the radial pressure the clamp exerts on the underlying hose or substrate. The radial pressure ($p_r$) a hose clamp or a tensioned band exerts is a function of the band tension (T), the band width (w) and the clamping diameter (d). For any fixed value of "T" and "d", an increase in "w" will decrease radial pressure, and a decrease in "w" will increase radial pressure. Manipulation of a simplified hoop stress formula can demonstrate this behavior; $2T=p_r\,w\,d$ transposes to $p_r=2T/(w\,d)$.

In addition to increasing a hose clamp or tension bands' radial pressure as a result of the liner's narrower contact width, the liner also can act as a spring, thus providing a thermal-compensating feature for the clamp. The spring effect will be described in more detail later. First, the drawings will be discussed in more detail.

Figure 1:
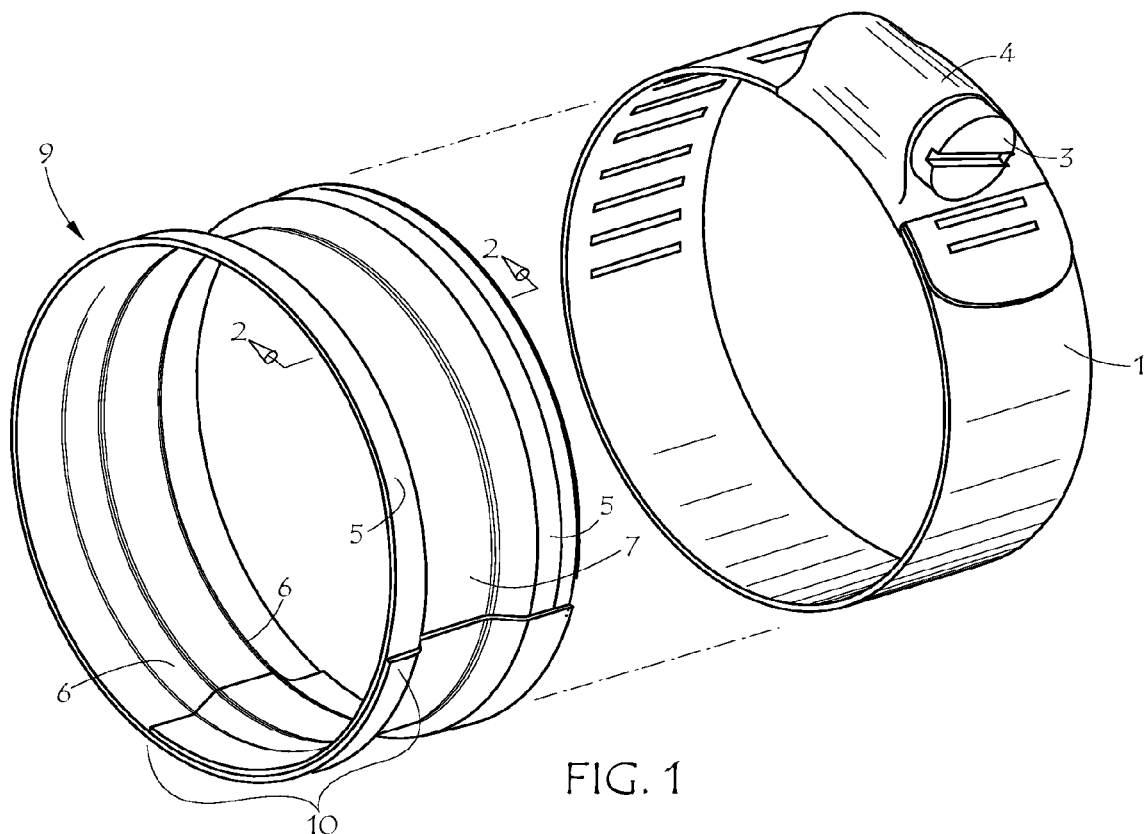
FIG. 1 is a perspective exploded view of a hose clamp assembly including clamp and spring liner in accordance with an embodiment of the present invention.
Figure 2:
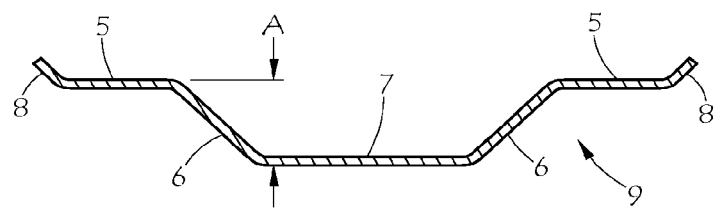
FIG. 2 is a partial sectional view of the spring liner of FIG. 1, taken along section 2-2.

Referring to FIG. 1, a hose clamp is shown comprising an outer annular band 1, and a typical tensioning means 3, 4. FIG. 1 also shows in exploded view flat spring liner 9 in accordance with the present invention. In another embodiment, spring liner 19 is shown in section in FIG. 2. Spring liner 9, as well as spring liner 19, is an annular ring with overlapping ends 10. Spring liner 9 and 19 comprise two flat annular circumferential shoulders 5 near the edges of the liner, a flat central annular circumferential contact portion 7 located between the two shoulders 5 and of smaller circumference than the shoulders, and two annular circumferential legs 6 there between connecting the inner edges of shoulders 5 to the outer edges of flat contact portion 7. FIG. 2 shows radial height differential A between the two shoulders 5 and the flat contact portion 7. When liner 9 or 19 is inserted into clamp band 1, the inner face of band 1 will abut or seat on shoulders 5, and gap A will result between the outer surface of contact portion 7 and the inner face of band 1 in the absence of clamp tensioning forces. Thus, flat portion 7 does not abut the inner face of band 1 in the absence of clamp tensioning forces.

The terms outward and inward refer to direction with respect to the center axis of the generally circular liner. Inward means directed toward the center axis of the liner. Outward means directed away from the center axis of the liner.

Figure 3:
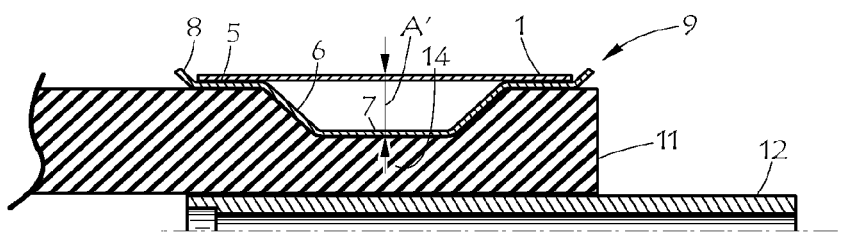
FIG. 3 is a partially fragmented view of a hose clamp assembly including spring liner, hose, and fitting in accordance with an embodiment of the present invention.

Upon applying clamp tensioning forces, i.e., tightening or tensioning of the band, the overlap section 10 of the liner can increase in length, resulting in a decrease in the circumference of the liner. As the band tightens, the liner is thus pulled into compressive engagement with the associated hose. FIG. 3 illustrates the hose clamp assembly in use with a hose 11 and a hose fitting 12. Band 1 of the hose clamp seats on two shoulders 5. The inward facing flat contact portion 7 of the liner creates a zone of relatively uniform compression 14 in the hose.

Figure 5:
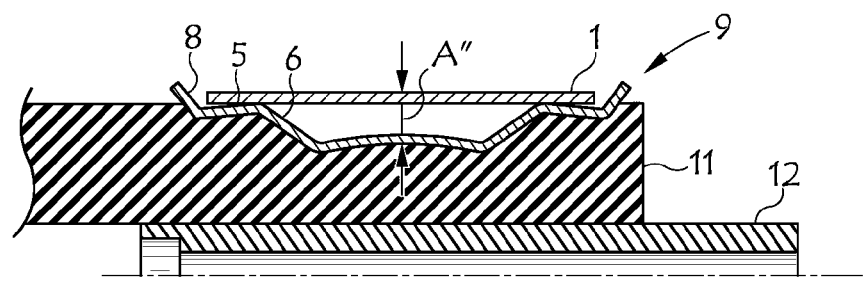
FIG. 5 is a partially fragmented view of the hose clamp assembly of FIG. 3 elastically deflected to a second position.
Figure 6:
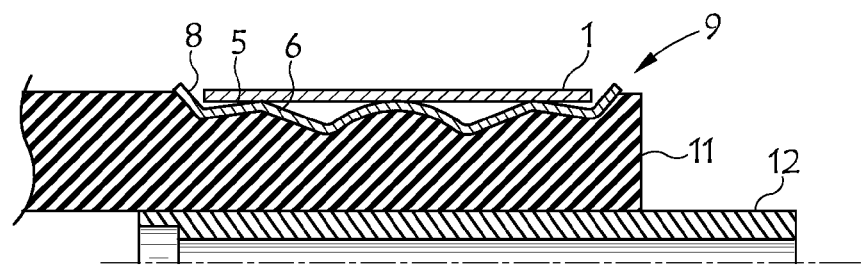
FIG. 6 is a partially fragmented view of the hose clamp assembly of FIG. 3 elastically deflected to a third position.

The profile of the liner is designed so that the two legs 6 can deflect elastically under the compressive forces, creating a spring effect. As the band is tensioned, the deflection of the legs will cause gap A to decrease to A' (A'≤A), as shown in FIG. 3, decrease to A", as shown in FIG. 5, or perhaps even disappear completely, as shown in FIG. 6. As the band is tensioned, the deflection may also cause the flat contact surface to deform slightly. The decrease in gap is an indication of the amount of spring energy stored in the annular spring liner. The net effect of these radial and axial deflections and the resulting compression forces on the hose is a much better initial and long term sealing effect than obtained with prior art hose clamp liner designs.

As the hose and clamp assembly is exposed to thermal fluctuations, the spring liner can respond by further deflecting or by relaxing, thus helping to maintain an excellent sealing force on the hose assembly. As the hose material, which is typically vulcanized rubber, takes on a compression set, or inelastic deformation, due to deterioration of elastic properties over time, the force exerted by the rubber will relax or decline, and the spring liner again relaxes or releases some of the stored spring energy, thus maintaining an excellent sealing force on the hose. Compared to prior liner designs with narrow ridges which create zones of very high compression, the present invention creates a more uniform zone of moderate compression, which may advantageously avoid extreme deformations and extreme effects of compression set in the rubber hose being clamped.

If the hose clamp is tensioned to the extent that gap A' is eliminated and the outer surface of contact portion 7 contacts the inner surface of band 1, then any further deflection of the spring liner requires much higher forces, commensurate with a dramatic increase in spring rate. Under this condition, the deflection of the spring liner in response to thermal expansion of the hose is very limited. However, under this condition, the spring liner's ability to relax or respond to thermal contraction of the hose is maximized. Thus, the clamp and spring liner may be designed so that in use, gap A' is maintained even in the presence of clamp tensioning forces. Alternately, the clamp and spring liner may be designed so that in use, the outer surface of the flat contact portion 7 may abut the inner face of the hose clamp 1 in the presence of clamp tensioning forces.

As shown in FIGS. 2 and 3, spring liner 19 may also have one or two radially outward flared flanges 8 to aid in aligning liner 19 within band 1. The flanges shown in the figures flare outward at about a 45° angle. Any suitable flare angle or flare shape may be used. Flanges 8, as well as legs 6, may be sharply bent or may have a more rounded, gradual transition from adjoining shoulders 5 or contact portion 7. Flanges 8 may extend the entire circumference of the liner or may be cut short in appropriate places to reduce interference in the overlap section 10 of the liner or to reduce interference between the liner and the tensioning means 3, 4. Alternately, or in addition to a flange, the spring liner may be more or less permanently affixed to band 1 by any means that provides an adequate bond, such as, but not limited to, heat welding, chemical welding, chemical bonding, staking, mechanical fasteners, or a combination of two or more of the foregoing.

The spring force exerted by the liner depends on the thickness and modulus of the material of which it is constructed. The force also depends on the precise profile, i.e. the shape and size of the legs, contact portion, and shoulders. The profile shown in FIG. 2, when formed out of sheet metal about 0.012 inches (0.3 mm) thick, is suitable for typical automotive hose clamping applications. One skilled in the art would be able to alter the materials, material properties, shoulder and flat surface dimensions, flange angles, overlap distance, and/or spring liner thickness to optimize the flat spring liner for particular applications. The profile need not be perfectly symmetric. The two shoulders, the legs, and the central flat surface may all be of different sizes. The central flat surface need not be at the exact center of the annular liner. The two leg angles may be different. The thickness of the liner may also vary in the axial direction.

The shoulders need not be broad, flat structures. A shoulder or shoulders may be a circumferential line of contact adapted to abut the inner face of the band of the hose clamp. Such a shoulder could be an outwardly convex ridge formed near the edge of the liner, or it could simply be an edge of the liner. The important feature of the shoulder is that it be adapted to contact or abut the inner face of the band of the hose clamp. Viewed in section as in FIG. 3, the contact between the inner face of the band 1 and the shoulder 5 could therefore be a point or a line. In three dimensional terms, the contact between the inner face of the band 1 and the shoulder 5 could therefore be a circular line or a cylindrical area, depending on the shape of the shoulder.

Friction between the overlapping ends of the spring liner can affect the clamping force achieved during assembly. To reduce the friction force, the overlapping ends may be coated with wax or other suitable lubricant. To increase the friction force, the overlapping section may be cleaned, roughened, grooved, knurled, or the like. Thus, one skilled in the art can optimize the friction as needed or desired.

Any of the various hose clamp tightening or tensioning means, i.e., "tensioner," known in the art may be used. By way of illustration, the tensioning mechanism may be a worm drive 3, 4 as shown in FIG. 1. Alternatively, the tensioner may be a T-bolt, a ratcheting mechanism, a bolt and barrel mechanism, a nut and bolt assembly, a permanent crimp, or the like, or combinations thereof. Alternatively, the clamp may be an endless band with thermally frozen-in strain, which is tensioned by releasing the strain and allowing the band to shrink onto the spring liner, hose and fitting. In addition, tensioning band or hose clamp width may vary. The proportionality of tensioning band width to liner width and liner contact width may vary.

Other known features of hose clamps may be incorporated if desired without departing from the scope of the invention. For example, various means of attaching the assembly to the hose, such as adhesive, a vulcanizing patch, a locating tab, a locating clip, and the like may be incorporated. Cutouts or apertures for adjusting spring stiffness, or the like may be incorporated.

In actual practice, a hose clamp with an annular spring liner is placed over the hose and fitting to be joined. Clamp diameter is reduced by means of the tensioning mechanism. Spring liner diameter is reduced proportionally to the clamp diameter reduction by increasing the circumferential overlap length of the liner. As the combined hose clamp and annular spring liner diameters decrease, radial pressure acting on the underlying hose and fitting increase. Because of the shape of the liner, the radial pressure on the hose is amplified from that generated by the clamp alone, while remaining relatively uniform in the hose region under the liner.

As the radial forces acting on the spring liner increase as a result of increased tension in the outer band, the spring liner deflects in such a manner that the shoulders 5 deflect downward towards the hose 11. This movement can continue until the desired tension is achieved. However, the movement becomes limited at the point where the central flat portion 7 contacts (if ever) the inner face of the clamp band 1. The deflections are elastic, spring-like behavior. Therefore, the liner can respond to variations in band tension and/or radial pressures as a spring. This spring behavior insures that the central flat portion 7 exerts sufficient radial pressure on the hose throughout the life of the clamp installation.

As an example of a possible modification, it is envisioned that in one embodiment of the invention, the inner face of the hose clamp could initially when assembled contact one shoulder of the spring liner, there being a gap between the inner face of the clamp and a second shoulder of the liner. As the hose clamp of this embodiment is tensioned, the gap between the inner face and the second shoulder would close as deformation energy is stored in the spring liner, with the clamp perhaps even finally seating on the second shoulder.

The following examples illustrate the use and benefits of an embodiment of the invention. For the examples, a hose clamp with worm drive tensioning as shown in FIG. 1 was obtained. The band had a width of 0.405 inches (10.3 mm) and a nominal diameter of about two and a half inches (about 65 mm). As an inventive example, a spring liner as shown in FIG. 2 was also constructed, having a total width of 0.47 inches (11.9 mm) and a width of contact portion 7 of 0.165 inches (4.2 mm), and this was used with the aforementioned hose clamp. As comparative example 1, the hose clamp was used without a spring liner. As comparative example 2, a spring liner having two inward ridges according to U.S. Pat. No. 7,302,741, FIG. 2, was constructed with similar total width and used with the hose clamp.

Figure 4:
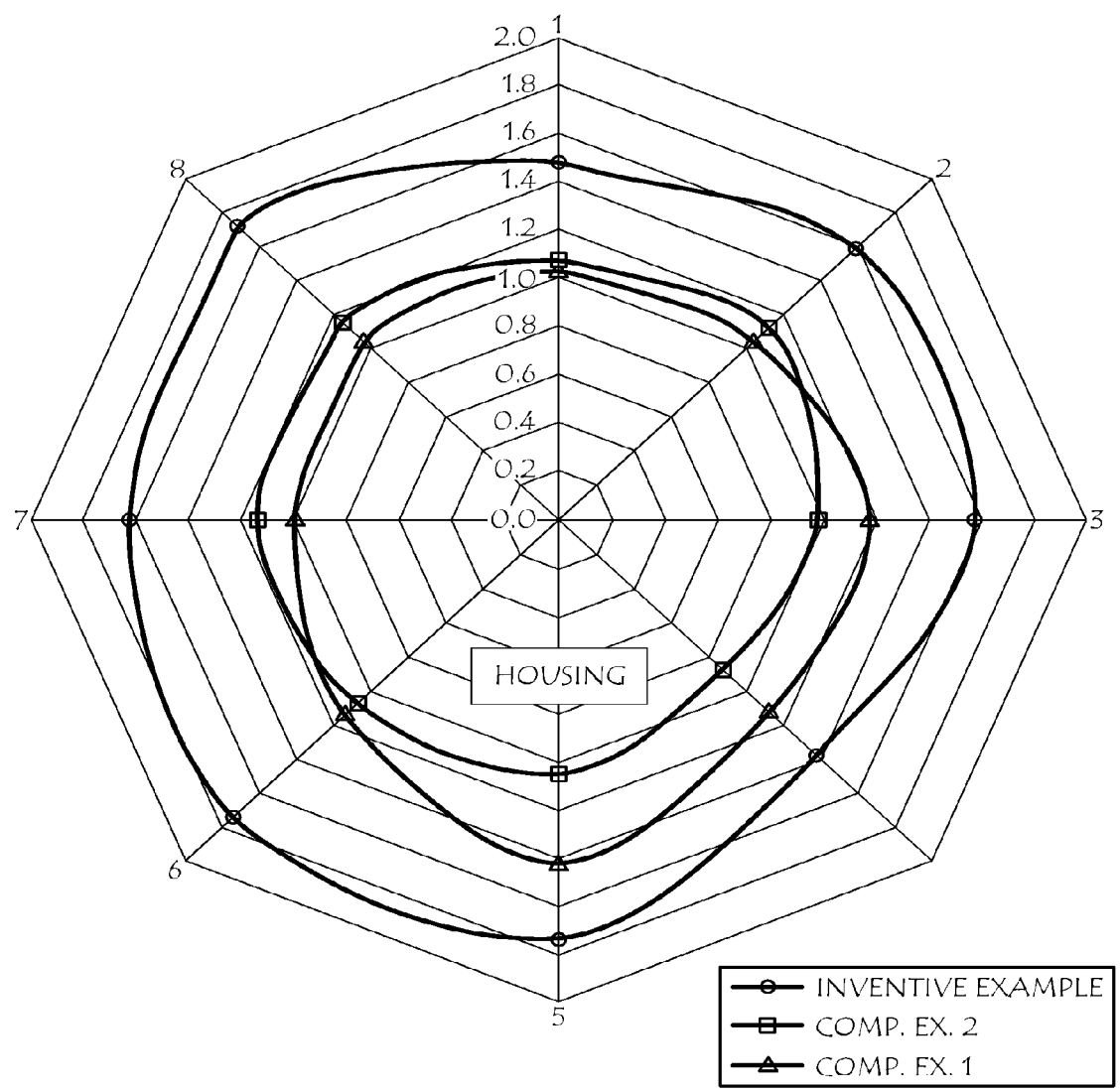
FIG. 4 is a graph of clamp pressure versus position around a hose for an embodiment of the invention and for two comparative examples.

The three examples were in turn applied to a reinforced rubber hose of about 2.25-inch internal diameter in which a smooth cylindrical mandrel or fitting was inserted. Between the mandrel and hose, a film-type pressure sensor was inserted. The pressure profile between hose and mandrel was recorded at about 31 positions in the circumferential direction by 44 positions in the axial direction, and the average pressure for the positions located directly under the liner was calculated and compared on a normalized basis. The same torque of 30 in-lbs (3.4 N-m) was applied to the worm drive for the inventive example and for comparative examples 1 and 2. The results of this comparison are presented in Table 1. Smoothed pressure profiles for this comparison are shown in FIG. 4. The Comparative Examples are abbreviated as "Comp. Ex." In FIG. 4. The profiles in FIG. 4 were smoothed by averaging all the positions along the axial direction at each of the 31 circumferential positions. Then seven groups of four and one group of three sequential data points of circumferential data were averaged resulting in eight data points for the smoothed circumferential pressure profiles shown in FIG. 4.

TABLE 1

| | Inventive Example | Comparative Ex. 1 No Liner | Comparative Ex. 2 Prior art Liner |
|---|---|---|---|
| Average Pressure (normalized) | 142 | 100 | 105 |

The results in Table 1 and FIG. 4 illustrate various advantages of the inventive spring liner. The average pressure results shown in Table 1 illustrate how the spring liner can amplify the clamp force to increase the radial sealing pressure. The 42% increase in average pressure over the clamp with no liner is, however, less than one would predict from the width difference of the inventive liner compared to the band. This short fall is believed due to edge effects and relaxation or compression set effects within the rubber. As such, the particular advantages exhibited may be dependent on the details of the hose construction and materials which is being clamped. Thus, the benefits of the invention, and the comparative advantages relative to the prior art liner, may depend on the type of hose and the type of application. The prior art liner, with its two ridges may still give higher peak pressures immediately under the ridges. However, some types of hose or application may be better clamped with a higher average pressure, but lower peak pressure.

In FIG. 4, it can be seen that the clamp pressure for the inventive example is higher than the comparative examples for the entire circumference. This should translate to improved sealing performance for the inventive example. FIG. 4 also illustrates that the flat spring liner provides more uniform distribution of pressure around the clamp circumference than the comparative example with no liner. The variation in the region of the worm-drive housing (near position 5 in FIG. 4) is significantly less when a liner is used than without a liner. This too should translate to improved sealing performance.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A method of installing a clamp, comprising:
   positioning the clamp over a hose, the clamp including a band and a spring liner positioned on an annular inner face of the band, the spring liner comprising a first circumferential shoulder near a first edge of the spring liner, a second circumferential shoulder near a second edge of the spring liner, a central, cylindrical contact portion having a flat surface section of smaller circumference than the shoulders of the spring liner when viewed in cross-section, a first inwardly-extending leg that connects the central, cylindrical contact portion to the first circumferential shoulder, and a second inwardly-extending leg that connects the central, cylindrical contact portion to the second circumferential shoulder,
   tightening the band to advance the central, cylindrical contact portion of the spring liner into engagement with the hose, and
   deflecting the spring liner to decrease a gap defined between the annular inner face of the band and the flat surface section of the central, cylindrical contact portion of the spring liner.

2. The method of claim 1, further comprising:
   engaging the first circumferential shoulder near the first edge of the spring liner with the annular inner face of the band, and
   engaging the second circumferential shoulder near the second edge of the spring liner with the annular inner face of the band.

3. The method of claim 2, wherein deflecting the spring liner includes:
   moving the first leg of the spring liner, and
   moving the second leg of the spring liner.

4. The method of claim 3, wherein deflecting the spring liner includes deforming the central, cylindrical contact portion.

5. The method of claim 1, wherein the spring liner deflects elastically.

6. A method of installing a clamp, comprising:
   positioning the clamp over a hose, the clamp including a band and a spring liner positioned on an annular inner face of the band, the spring liner comprising a first circumferential shoulder near a first edge of the spring liner, a second circumferential shoulder near a second edge of the spring liner, a first leg extending inwardly in a first direction from a first end attached to the first circumferential shoulder to a second end, a second leg extending inwardly in a first direction from a first end attached to the second circumferential shoulder to a second end, and a central, cylindrical contact portion extending from the second end of the first leg to the second end of said second leg, the contact portion having a flat surface section of smaller circumference than the shoulders such that a gap is defined between the contact portion and the inner face of the hose clamp when viewed in cross-section,
   tightening the band to advance the central, cylindrical contact portion of the spring liner into engagement with the hose, and
   deflecting the spring liner to decrease the gap defined between the annular inner face of the band and the flat surface section of the central, cylindrical contact portion of the spring liner.

7. The method of claim 6, wherein deflecting the spring liner includes:
   moving the first leg of the spring liner, and
   moving the second leg of the spring liner.

8. The method of claim 7, wherein deflecting the spring liner includes deforming the central, cylindrical contact portion.

9. The method of claim 6, wherein the spring liner deflects elastically.

* * * * *